(12) United States Patent
Golubovic et al.

(10) Patent No.: US 11,231,331 B2
(45) Date of Patent: Jan. 25, 2022

(54) TEMPERATURE SENSING TAPE

(71) Applicant: Littelfuse, Inc., Chicago, IL (US)

(72) Inventors: Boris Golubovic, San Francisco, CA (US); Martin G. Pineda, Fremont, CA (US); Yuriy Borisovich Matus, Pleasanton, CA (US); Jianhua Chen, Sunnyvale, CA (US)

(73) Assignee: Littelfuse, Inc., Chicago, IL (US)

( * ) Notice: Subject to any disclaimer, the term of this patent is extended or adjusted under 35 U.S.C. 154(b) by 174 days.

(21) Appl. No.: 16/122,535

(22) Filed: Sep. 5, 2018

(65) Prior Publication Data

US 2019/0072436 A1    Mar. 7, 2019

Related U.S. Application Data

(60) Provisional application No. 62/554,088, filed on Sep. 5, 2017.

(51) Int. Cl.
*G01K 1/22* (2006.01)
*G01K 7/22* (2006.01)
(Continued)

(52) U.S. Cl.
CPC .............. *G01K 7/22* (2013.01); *C09J 7/20* (2018.01); *C09J 9/02* (2013.01); *G01K 1/143* (2013.01); *H01B 7/04* (2013.01); *H01C 1/1406* (2013.01); *H01C 1/1413* (2013.01); *H01C 7/027* (2013.01); *H01C 7/049* (2013.01);
(Continued)

(58) Field of Classification Search
CPC ........ G01K 7/16; G01K 7/22; G01K 2217/00; G01K 1/143; G01K 1/16; G01K 7/00; G01K 7/183; G01N 27/046; G09J 7/20; G09J 9/02; G09J 2301/314; H01B 7/04; H01C 1/1406; H01C 7/049; H01C 7/027; H01C 1/1413; H01M 10/482; H01M 10/486
See application file for complete search history.

(56) References Cited

U.S. PATENT DOCUMENTS 2,290,105 A    7/1942  Sigurd, I
3,201,736 A *  8/1965  Ovshinsky ............... H01C 7/04
                                                        338/25
(Continued)

FOREIGN PATENT DOCUMENTS

CA         2124896 A1   12/1994
CN       101521963 A    9/2009
(Continued)

*Primary Examiner* — Gail Kaplan Verbitsky
(74) *Attorney, Agent, or Firm* — Kacvinsky Daisak Bluni PLLC

(57) ABSTRACT

A temperature sensing tape including a flexible, electrically insulating substrate, a plurality of temperature sensing elements disposed on the substrate, each temperature sensing element including a first electrode and a second electrode arranged in a confronting, spaced-apart relationship to define a gap therebetween, and a variable resistance material disposed within the gap and connecting the first electrode to the second electrode, wherein the first electrode of at least one of the temperature sensing elements is connected to the second electrode of an adjacent temperature sensing element by a flexible electrical conductor.

8 Claims, 3 Drawing Sheets

(51) Int. Cl.
| | |
|---|---|
| *H01C 7/04* | (2006.01) |
| *H01M 10/48* | (2006.01) |
| *H01C 7/02* | (2006.01) |
| *C09J 7/20* | (2018.01) |
| *C09J 9/02* | (2006.01) |
| *G01K 1/143* | (2021.01) |
| *H01B 7/04* | (2006.01) |
| *H01C 1/14* | (2006.01) |

(52) U.S. Cl.
CPC ....... *H01M 10/482* (2013.01); *H01M 10/486* (2013.01); *C09J 2203/326* (2013.01); *C09J 2301/314* (2020.08)

(56) References Cited

U.S. PATENT DOCUMENTS

| | | | | |
|---|---|---|---|---|
| 3,297,846 | A | | 1/1967 | Peltier |
| 4,574,264 | A | * | 3/1986 | Takahashi .............. G01N 27/16 338/34 |
| 4,636,765 | A | | 1/1987 | Krueger |
| 4,710,550 | A | * | 12/1987 | Kranbuehl .......... B29C 35/0288 526/60 |
| 4,968,964 | A | * | 11/1990 | Nagai ................... H01C 1/1406 338/22 R |
| 5,192,940 | A | | 3/1993 | Yajima et al. |
| 5,197,804 | A | * | 3/1993 | Tani ........................ G01K 7/183 374/185 |
| 5,199,791 | A | * | 4/1993 | Kasanami ................ G01K 7/18 338/25 |
| 5,312,415 | A | * | 5/1994 | Palermo ............. A61B 17/1214 606/108 |
| 5,831,512 | A | * | 11/1998 | Wienand ................ G01K 7/183 338/25 |
| 6,140,906 | A | * | 10/2000 | Kaihara ................ G01K 7/183 29/610.1 |
| 6,155,711 | A | * | 12/2000 | Schaupert .............. G01K 15/00 338/22 R |
| 6,159,386 | A | * | 12/2000 | Wienand ................ H01C 7/008 216/16 |
| 6,445,276 | B2 | | 9/2002 | Schon |
| 6,445,277 | B1 | | 9/2002 | Ishikawa et al. |
| 6,974,249 | B1 | * | 12/2005 | Fair .......................... G01K 3/04 116/206 |
| 7,598,840 | B2 | | 10/2009 | Lu |
| 7,944,360 | B2 | | 5/2011 | Kim et al. |
| 8,864,373 | B2 | | 10/2014 | Vu et al. |
| 9,000,351 | B2 | | 4/2015 | Noda et al. |
| 9,528,888 | B2 | * | 12/2016 | Wolkin ................ G01K 17/006 |
| 9,829,390 | B2 | * | 11/2017 | Wienand ................ G01K 1/08 |
| 9,851,262 | B2 | * | 12/2017 | Nagatomo ........... H01C 1/1413 |
| 9,891,117 | B2 | * | 2/2018 | Inaba ........................ G01K 7/22 |
| 10,488,272 | B2 | * | 11/2019 | Uozumi ..................... G01K 7/22 |
| 10,502,638 | B2 | * | 12/2019 | Miura ......................... G01K 7/22 |
| 10,631,372 | B2 | * | 4/2020 | Feng ......................... H05B 3/84 |
| 2004/0100355 | A1 | | 5/2004 | Tanaka |
| 2006/0199003 | A1 | * | 9/2006 | Cain ...................... G01K 3/005 428/343 |
| 2013/0044401 | A1 | | 2/2013 | Yeh et al. |
| 2014/0153613 | A1 | * | 6/2014 | Wienand ................. G01K 7/18 374/185 |
| 2015/0071326 | A1 | * | 3/2015 | Nagatomo ............. H01C 7/008 374/185 |
| 2015/0092820 | A1 | * | 4/2015 | Tanaka ................... H01C 7/12 374/185 |
| 2015/0260586 | A1 | * | 9/2015 | Inaba ..................... H01C 7/041 374/185 |
| 2016/0189831 | A1 | * | 6/2016 | Fujita ..................... H01C 7/041 374/185 |
| 2016/0238547 | A1 | * | 8/2016 | Park ........................... C08K 7/24 |
| 2017/0127944 | A1 | * | 5/2017 | Sun ........................... G01K 7/22 |
| 2018/0289082 | A1 | * | 10/2018 | Burrows ............ A41D 13/0051 |
| 2019/0331536 | A1 | * | 10/2019 | Hioki ...................... G01K 1/024 |
| 2020/0020467 | A1 | * | 1/2020 | Rentrop ................. H01C 7/043 |
| 2020/0348186 | A1 | * | 11/2020 | Suzuki ..................... G01K 7/22 |

FOREIGN PATENT DOCUMENTS

| | | | |
|---|---|---|---|
| CN | 101907497 A | | 12/2010 |
| CN | 102052972 A | | 5/2011 |
| CN | 102310290 A | | 1/2012 |
| CN | 103210290 A | | 7/2013 |
| CN | 104204751 A | | 12/2014 |
| DE | 3008141 A1 | | 9/1981 |
| DE | 4143095 C1 | | 4/1993 |
| FR | 2305845 A1 | | 10/1976 |
| FR | 2477761 A1 | | 9/1981 |
| IT | 1034542 B | | 10/1979 |
| JP | 01286865 A | * | 11/1989 .............. B41J 2/345 |
| JP | 05326204 A | * | 12/1993 |
| JP | 1997184770 A | | 7/1997 |
| JP | 2001250701 A | | 9/2001 |
| JP | 3692042 B2 | | 9/2005 |
| JP | 55066745 A | * | 8/2014 |
| KR | 20060028661 A | | 3/2006 |
| KR | 20130128383 A | | 11/2013 |

* cited by examiner

TEMPERATURE SENSING TAPE

CROSS-REFERENCES TO RELATED APPLICATIONS

This application claims the benefit of U.S. Provisional Patent Application No. 62/554,088, filed Sep. 5, 2017, which is incorporated by reference herein in its entirety.

BACKGROUND

Field

The present invention relates generally to temperature sensing devices. More specifically, the present invention relates to a temperature sensing tape having a plurality of integrated temperature sensing elements formed of variable resistance material.

Description of Related Art

Electrical devices can be damaged by overtemperature and overcurrent conditions if such conditions are allowed to persist. Thus, it is common for electrical devices to be equipped with temperature sensing devices that can be used to measure temperature variations at discrete locations on the surface of an electrical device. If a measured temperature exceeds a predetermined threshold, the electrical device may be automatically shut off until the overtemperature/overcurrent condition subsides or is remedied, thereby mitigating damage to the electrical device.

Some electrical devices have large surface areas or include numerous interconnected components that may individually experience overtemperature and/or overcurrent conditions. In such devices, it may be necessary to measure temperatures at various discrete locations on the surface of an electrical device, or to measure temperatures on the surfaces of a plurality of components of an electrical device in a distributed manner. However, implementing a plurality of traditional, discrete temperature sensing elements in a single electrical device can be prohibitively expensive and/or may require an amount of space that is not available in a given device form factor.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

An exemplary embodiment of a temperature sensing tape in accordance with the present disclosure may include an electrically insulating substrate, a first conductor disposed on the substrate and terminating in a first electrode, a second conductor disposed on the substrate and terminating in a second electrode, wherein the first electrode and the second electrode are disposed in a confronting, spaced-apart relationship to define a gap therebetween, and a variable resistance material disposed within the gap and connecting the first electrode to the second electrode.

Another exemplary embodiment of a temperature sensing tape in accordance with the present disclosure may include a flexible, electrically insulating substrate, a plurality of temperature sensing elements disposed on the substrate, each temperature sensing element including a first electrode and a second electrode arranged in a confronting, spaced-apart relationship to define a gap therebetween, and a variable resistance material disposed within the gap and connecting the first electrode to the second electrode, wherein the first electrode of at least one of the temperature sensing elements is connected to the second electrode of an adjacent temperature sensing element by a flexible electrical conductor.

DETAILED DESCRIPTION

Exemplary embodiments of a temperature sensing tape in accordance with the present disclosure will now be described more fully hereinafter with reference to the accompanying drawings. The temperature sensing tape may, however, be embodied in many different forms and should not be construed as being limited to the embodiments set forth herein. Rather, these embodiments are provided so that this disclosure will convey certain exemplary aspects of the temperature sensing tape to those skilled in the art.

Figure 1A:
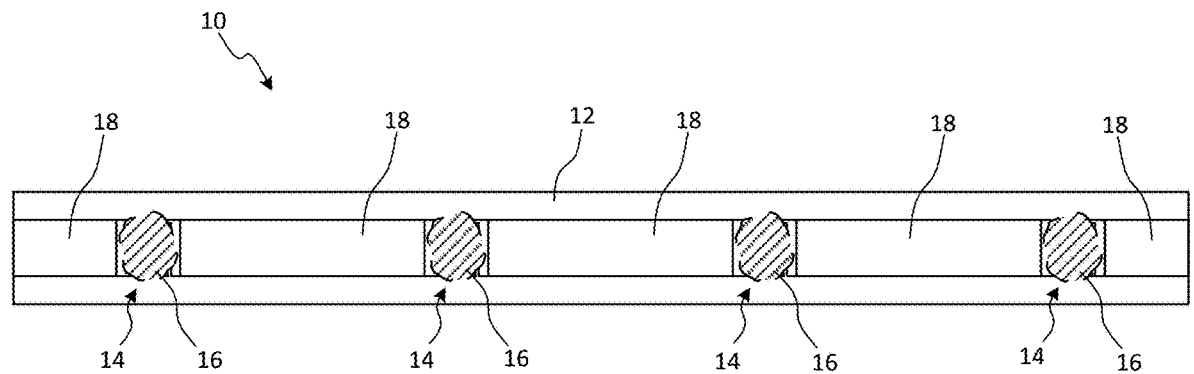
FIG. 1A is a top view illustrating an exemplary embodiment of a temperature sensing tape in accordance with the present disclosure.

Referring to FIG. 1A, a top view illustrating a temperature sensing tape 10 (hereinafter "the tape 10") in accordance with an exemplary embodiment of the present disclosure is shown. The tape 10 may include an electrically insulating, flexible substrate 12. The substrate 12 may be formed of a strip of dielectric material having an adhesive material on one or both sides thereof for allowing the tape 10 to be adhered to a surface (e.g., a surface of an electrical device). In various, non-limiting embodiments, the substrate 12 may be Scotch Tape, polyvinyl chloride (PVC) tape, Mylar, etc.

A plurality of temperature sensing elements 14 may be disposed on the substrate 12 and may be spaced apart from one another along a length of the substrate 12. Each of the temperature sensing elements 14 may include a quantity of variable resistance material 16 bridging a pair of adjacent, interdigitated electrodes as further described below. By way of example, the tape 10 is shown in FIG. 1A as including a total of four temperature sensing elements 14. In various embodiments, the tape 10 may include a greater or fewer number of temperature sensing elements 14 without departing from the present disclosure, with the total number of temperature sensing elements 14 generally being dictated by the length of the tape 10 and the distance between the temperature sensing elements 14. While the temperature sensing elements 14 are shown in FIG. 1A as being evenly spaced apart from one another along the length of the substrate 12, various embodiments of the tape 10 may include temperature sensing elements 14 disposed at irregular intervals along the length of the substrate 12, such as may be dictated by the requirements of a particular application of the tape 10.

The tape 10 may further include a plurality of flexible conductors 18 disposed on the substrate 12. The flexible conductors 18 may extend between, and may be electrically connected to, the temperature sensing elements 14 as further described below. The flexible conductors 18 may be formed of elongated segments of flexible, electrically conductive material that may be adhered to, printed on, or otherwise applied to the substrate 12. Examples of such materials include, but are not limited to, copper mesh, silver epoxy, various types of metal wire or ribbon, conductive ink, etc.

Figure 1B:
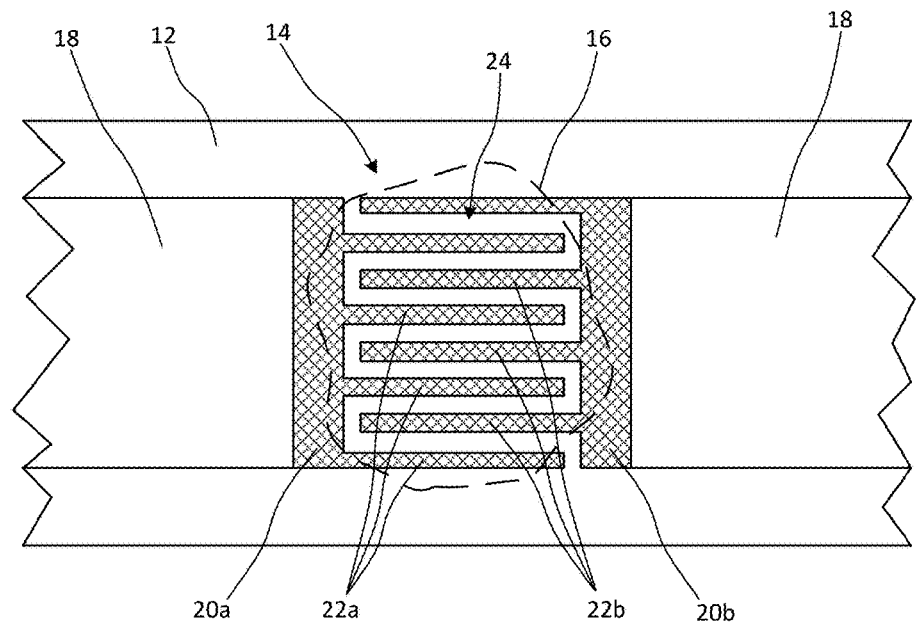
FIG. 1B is a detailed top view illustrating a temperature sensing element of the temperature sensing tape shown in FIG. 1A.

Referring to FIG. 1B, a detailed top view illustrating one of the temperature sensing elements 14 and surrounding portions of the tape 10 is shown. The variable resistance material 16 is shown as transparent for clarity of the following description. It will be understood that all of the temperature sensing elements 14 shown in FIG. 1A are substantially identical to the temperature sensing element 14 shown in FIG. 1B and that the following description of the temperature sensing element 14 shown in FIG. 1B shall therefore apply to all of the temperature sensing elements 14 shown in FIG. 1A.

Figure 1C:
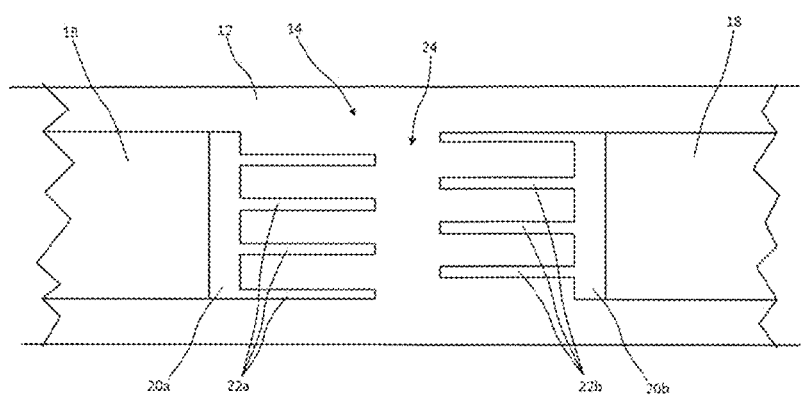
FIG. 1C is a detailed top view illustrating a temperature sensing element of the temperature sensing tape shown in FIG. 1A.

The temperature sensing element 14 may include electrodes 20*a, b* that are disposed on the substrate 12 in a confronting arrangement and that are electrically connected to ends of adjacent flexible conductors 18 (e.g., with solder, conductive adhesive, etc.). Each of the electrodes 20*a, b* may include a plurality of fingers or tines 22*a, b*. The tines 22*a* of the electrode 20*a* may be disposed in an interdigitated, spaced-apart relationship with the tines 22*b* of the electrode 20*b* to define a serpentine, tortuous gap 24 therebetween. In some embodiments of the tape 10, the electrodes 20*a, b* may be disposed on an intermediate substrate (e.g., a segment of FR-4) which may in-turn be disposed on, and adhered to, the substrate 12. In other embodiments of the tape 10, the electrodes 20*a, b* may be integral, contiguous portions of the flexible conductors 18. For example, confronting ends of the adjacent flexible conductors 18 may be cut, printed, or otherwise formed to define the interdigitated tines 22*a, b*, as shown in FIG. 1C. In other embodiments of the tape 10, the tines 22*a, b* may be omitted, and the adjacent ends of the flexible conductors 18 may instead terminate in flat edges or in edges having various other contours or shapes, the edges being spaced from one another and disposed in a confronting relationship to define a gap therebetween.

The variable resistance material 16 may be disposed on the tines 22*a, b* and may bridge and/or fill the gap 24, thus connecting the tines 22*a* to the tines 22*b*. In various embodiments, the variable resistance material 16 may be a positive temperature coefficient (PTC) material having an electrical resistance that may increase sharply when the variable resistance material 16 reaches a predefined "activation temperature." In other embodiments, the variable resistance material 16 may be a negative temperature coefficient (NTC) material having an electrical resistance that may decrease sharply when the variable resistance material 16 reaches a predefined "activation temperature." In a specific, non-limiting embodiment, the variable resistance material 16 may be a polymeric positive temperature coefficient (PPTC) material formed of conductive particles (e.g., conductive ceramic particle) suspended in a polymer resin. In some embodiments, the variable resistance material 16 (either PTC or NTC) may be applied to the tines 22*a, b* as a fluidic ink or as a compound that may be subsequently cured to form a solid mass that partially covers and/or envelopes the tines 22*a, b*.

It is contemplated that the tape 10 can be rolled and stored in the manner of a conventional roll of tape, and that a desired length of the tape 10 can be dispensed (i.e., unrolled) and cut from the roll for use in an application.

Figure 2:
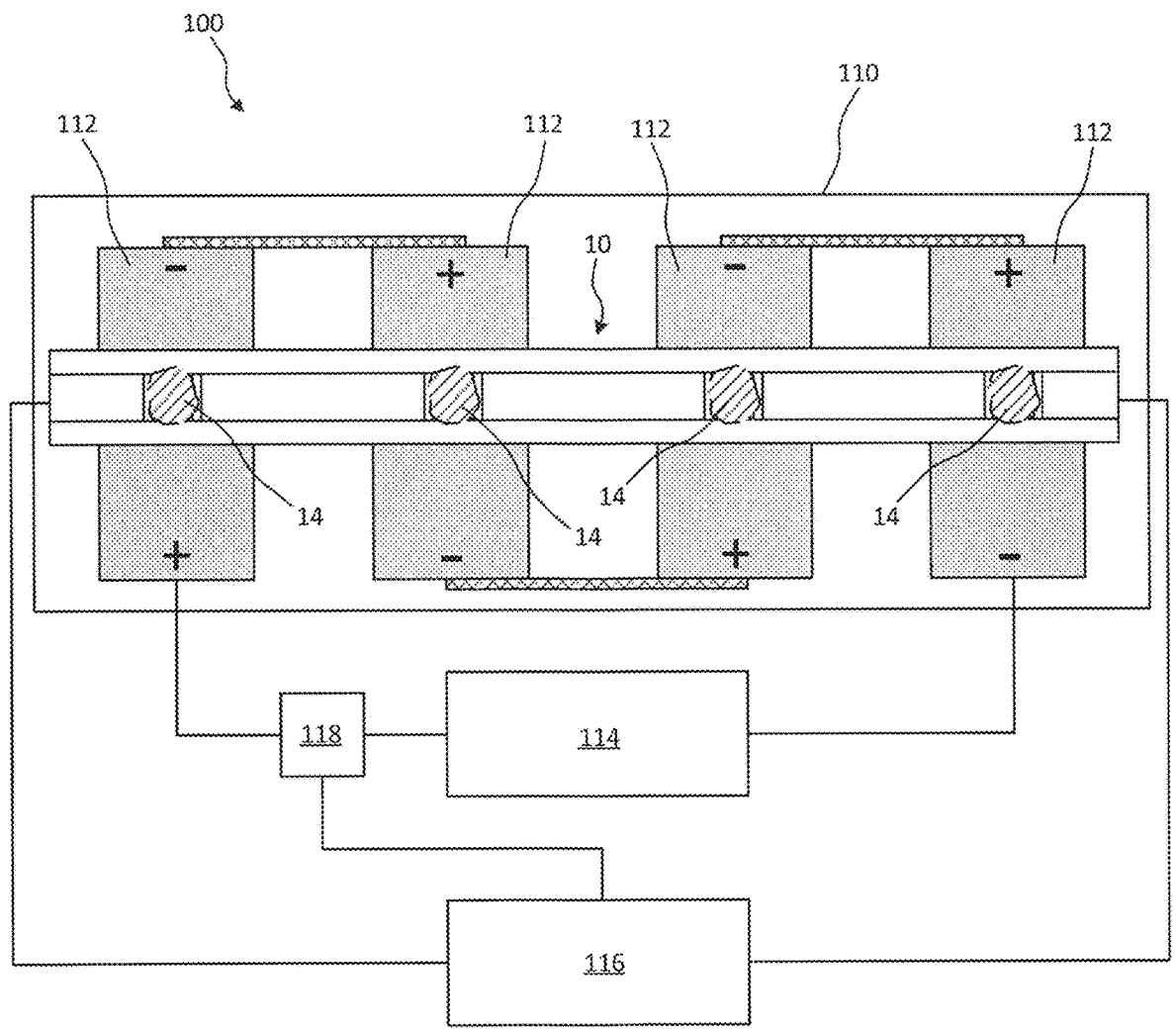
FIG. 2 is a schematic view illustrating an exemplary embodiment of an electrical device implementing the temperature sensing tape shown in FIG. 1A.

Referring to FIG. 2, a schematic illustration of an exemplary electrical device 100 implementing the above-described tape 10 is shown. The electrical device 100 may include one or more components (hereinafter "the protected component") that may be protected by the tape 10. In the exemplary embodiment shown in FIG. 2, the protected component is a battery 110 having a plurality of cells 112 that are electrically connected in series. The battery 110 may be connected to a load 114 for supplying electrical power thereto. In various examples, the battery 110 may be a Li-ion battery, a Li-Polymer battery, a Ni-MH rechargeable battery, or the like. The present disclosure is not limited in the regard, and it is contemplated that the protected component may alternatively be, or may alternatively include, any of a variety of electrical power sources and/or electrical devices that may benefit from overcurrent or overtemperature protection.

The tape 10 may be adhered to the battery 110, with the temperature sensing elements 14 disposed on surfaces of respective cells 112 of the battery 110. Particularly, each of the temperature sensing elements 14 may be positioned so as to be under the thermal influence of a respective one of the cells 112 such that an increase in a temperature of one of the cells 112 may cause an increase in a temperature of a respective one of the temperature sensing elements 14 disposed thereon.

The electrical device 100 may further include a control element 116 (e.g., a digital control element such as an ASIC, a microprocessor, etc.) that may be electrically connected to the flexible conductors 18 of the tape 10 and that may be configured to monitor a resistance in the tape 10 as further described below. The control element 116 may also be operatively connected to a disconnect switch 118 (e.g., a FET, a relay, etc.) that may be connected in electrical series intermediate the battery 110 and the load 114.

During normal operation of the electrical device 100, the battery 110 may supply electrical power to the load 114, and the temperatures of the cells 112 may be within a normal operating range (e.g., less than 80 degrees Celsius). However, upon the occurrence of an overtemperature or overcurrent condition, the temperature of one or more of the cells 112 may increase above the normal operating range, which may in-turn cause the temperatures of respective temperature sensing elements 14 of the tape 10 to increase. If the temperature of one or more of the temperature sensing elements 14 increases above the activation temperature, the resistance in the tape 10 may increase sharply (if the variable resistance material 16 is a PTC material) or decrease sharply (if the variable resistance material 16 is a NTC material). An increase in the temperatures of the cells 112 may result from exposure to an external heat source (e.g., the electrical device 100 sitting out in the sun), or from an overcurrent condition caused by an internal fault in the battery 110, for example.

The control element 116 may be configured to monitor a resistance of the tape 10 and to control operation of the device 100 accordingly. For example, assuming the variable resistance material 16 is a PTC material, if the control element 116 measures a relatively low resistance in the tape 10, indicating that the temperatures of the temperature sensing elements 14 are below the activation temperature, the control element 116 may determine that the temperatures of the cells 112 are within a normal, safe operating range. However, if the control element 116 measures a relatively high resistance in the tape 10, indicating that the temperature of one of more of the temperature sensing elements 14 is above the activation temperature, the control element 116 may determine that the temperature of one or more of the cells 112 has exceeded the normal, safe operating range. If the control element 116 determines that the temperature of one or more of the cells 112 has exceeded the normal, safe operating range, the control element 116 may open the disconnect switch 118, thereby arresting the flow of current in the electrical device 100 and preventing or mitigating damage that could otherwise result if the overtemperature or overcurrent condition were allowed to persist.

It will be appreciated by those of ordinary skill in the art that the tape 10 can be manufactured and implemented in an electrical device at a lower cost and with less complexity relative to traditional temperature sensing devices.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

We claim:

1. A temperature sensing tape comprising:
an electrically insulating substrate;
a first conductor disposed on the electrically insulating substrate and terminating in a first electrode, the first electrode comprising a first plurality of tines;
a second conductor disposed on the electrically insulating substrate and terminating in a second electrode, the second electrode comprising a second plurality of tines;
a variable resistance material comprising a curable compound; and
an adhesive material for facilitating adhesion of the electrically insulating substrate to an electrical device;
wherein the temperature sensing tape is made by:
   forming the electrically insulating substrate on a strip of dielectric material, the dielectric material having the adhesive material on one or both sides;
   disposing the first conductor and the first electrode on the electrically insulated substrate, the first conductor and the first electrode being formed from a single, contiguous piece of electrically conductive material;
   disposing the second conductor and the second electrode on the electrically insulated substrate, the second conductor and the second electrode being formed from a single, contiguous piece of electrically conductive material, wherein the first electrode and the second electrode are disposed in a confronting, spaced-apart relationship and the first plurality of tines is disposed in an interdigitated relationship with the second plurality of tines to define a gap therebetween;
   curing the compound of the variable resistance material to form a solid mass; and
   depositing the solid mass on the first plurality of tines and the second plurality of tines such that the variable resistance material partially bridges the gap, the first conductor, the second conductor, and the variable resistance material defining a temperature sensing element, wherein the temperature sensing tape comprises a plurality of temperature sensing elements disposed on the electrically insulated substrate and electrically connected to one another in series, the temperature sensing tape being capable of being rolled and stored as a conventional roll of tape.

2. The temperature sensing tape of claim 1, wherein the substrate, the first conductor, and the second conductor are formed of flexible materials.

3. The temperature sensing tape of claim 1, wherein the first and second conductors are formed of at least one of an electrically conductive wire, mesh, ribbon, epoxy, and ink.

4. The temperature sensing tape of claim 1, wherein the temperature sensing elements are evenly spaced apart from one another along a length of the substrate.

5. The temperature sensing tape of claim 1, wherein the variable resistance material is a positive temperature coefficient (PTC) material.

6. The temperature sensing tape of claim 5, wherein the variable resistance material is a polymeric positive temperature coefficient (PTC) material.

7. The temperature sensing tape of claim 1, wherein the variable resistance material is a negative temperature coefficient (NTC) material.

8. The temperature sensing tape of claim 1, wherein the temperature sensing elements are not evenly spaced apart from one another along a length of the substrate.

* * * * *